(12) United States Patent
Uminski et al.

(10) Patent No.: US 8,194,699 B2
(45) Date of Patent: Jun. 5, 2012

(54) RADIO SCHEDULER AND DATA PLANE INTERFACE

(75) Inventors: Piotr Uminski, Gdynia (PL); Tomasz Madejski, Gdansk (PL); Krzysztof Perycz, Chmielno (PL)

(73) Assignee: Intel Corporation, Santa Clara ( * ) Notice: Subject to any disclaimer, the term of this patent is extended or adjusted under 35 U.S.C. 154(b) by 759 days.

(21) Appl. No.: 11/859,083

(22) Filed: Sep. 21, 2007

(65) Prior Publication Data

US 2009/0080369 A1 Mar. 26, 2009

(51) Int. Cl.
*H04J 3/16* (2006.01)
*H04J 3/22* (2006.01)
*H04J 3/24* (2006.01)

(52) U.S. Cl. ........................ 370/468; 370/473

(58) Field of Classification Search .................. 370/328, 370/329, 336, 392, 468, 473
See application file for complete search history.

(56) References Cited

U.S. PATENT DOCUMENTS

| | | | | |
|---|---|---|---|---|
| 7,266,087 B2* | 9/2007 | Wahl | | 370/252 |
| 7,301,950 B1* | 11/2007 | Cheong et al. | | 370/395.21 |
| 7,886,131 B1* | 2/2011 | Kang | | 712/220 |
| 2003/0135632 A1* | 7/2003 | Vrzic et al. | | 709/231 |
| 2004/0100929 A1* | 5/2004 | Garcia-Luna-Aceves | | 370/338 |
| 2005/0089064 A1* | 4/2005 | Zimmerman et al. | | 370/468 |
| 2005/0122999 A1* | 6/2005 | Scherzer et al. | | 370/480 |
| 2006/0033746 A1* | 2/2006 | Ogura | | 345/570 |
| 2006/0109832 A1* | 5/2006 | Ginzburg | | 370/346 |
| 2006/0133274 A1* | 6/2006 | Lee et al. | | 370/230 |
| 2006/0159016 A1* | 7/2006 | Sagfors et al. | | 370/230 |
| 2007/0072604 A1* | 3/2007 | Wang | | 455/428 |
| 2007/0133461 A1* | 6/2007 | Lenzini et al. | | 370/329 |
| 2007/0161364 A1* | 7/2007 | Surineni et al. | | 455/343.4 |
| 2007/0171909 A1* | 7/2007 | Pignatelli | | 370/392 |
| 2007/0298808 A1* | 12/2007 | Pan et al. | | 455/452.1 |
| 2008/0008203 A1* | 1/2008 | Frankkila et al. | | 370/412 |
| 2008/0037578 A1* | 2/2008 | Carlson et al. | | 370/463 |
| 2008/0090585 A1* | 4/2008 | Hart et al. | | 455/453 |
| 2008/0159205 A1* | 7/2008 | Sekiya et al. | | 370/328 |
| 2008/0165719 A1* | 7/2008 | Visotsky | | 370/315 |
| 2008/0220788 A1* | 9/2008 | Stanwood et al. | | 455/450 |
| 2008/0299963 A1* | 12/2008 | Balachandran et al. | | 455/422.1 |
| 2009/0010263 A1* | 1/2009 | Ma et al. | | 370/395.4 |
| 2009/0109905 A1* | 4/2009 | Ahmadi | | 370/329 |
| 2009/0213871 A1* | 8/2009 | Carlson et al. | | 370/462 |
| 2009/0262746 A1* | 10/2009 | Kwak | | 370/401 |
| 2010/0014463 A1* | 1/2010 | Nagai et al. | | 370/328 |

* cited by examiner

*Primary Examiner* — Chi Pham
*Assistant Examiner* — Farah Faroul
(74) *Attorney, Agent, or Firm* — Sutherland, Asbill & Brennan, LLP

(57) ABSTRACT

A media access control architecture operates to receive bandwidth requests in a first radio frame from mobile stations for uplink transmissions. A data plane provides once per radio frame a first aggregated message to a radio scheduler in a control plane. The first aggregated message comprises bandwidth requests for uplink transmissions received in the first radio frame from the mobile stations. Two or more messages for downlink transmission of packets are received from a core network for transmission to one or more of the mobile stations. The data plane provides once per radio frame a second aggregated message to the radio scheduler. The second aggregated message comprises the messages received from the core network for downlink transmission. At least one or more uplink transmissions or one or more downlink transmissions, or combinations thereof, are scheduled by the radio scheduler.

8 Claims, 4 Drawing Sheets

RADIO SCHEDULER AND DATA PLANE INTERFACE

BACKGROUND

In a wireless network such as a Worldwide Interoperability for Microwave Access (WiMAX) network, one of the more important modules of the base station (BS) media access control (MAC) software is the Radio Scheduler. The Radio Scheduler is responsible for adaptively controlling uplink and downlink data traffic in a highly changing radio transmission environment. Based on per-connection Quality of Service (QoS) parameters, and the current link state, the Radio Scheduler module schedules downlink packets towards mobile stations (MS) and gives uplink bandwidth grants for uplink packets from mobile stations. For each downlink-bound packet arriving at the base station, and for each uplink grant request for a mobile station, the Radio Scheduler works out a decision when a given transmission should take place.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
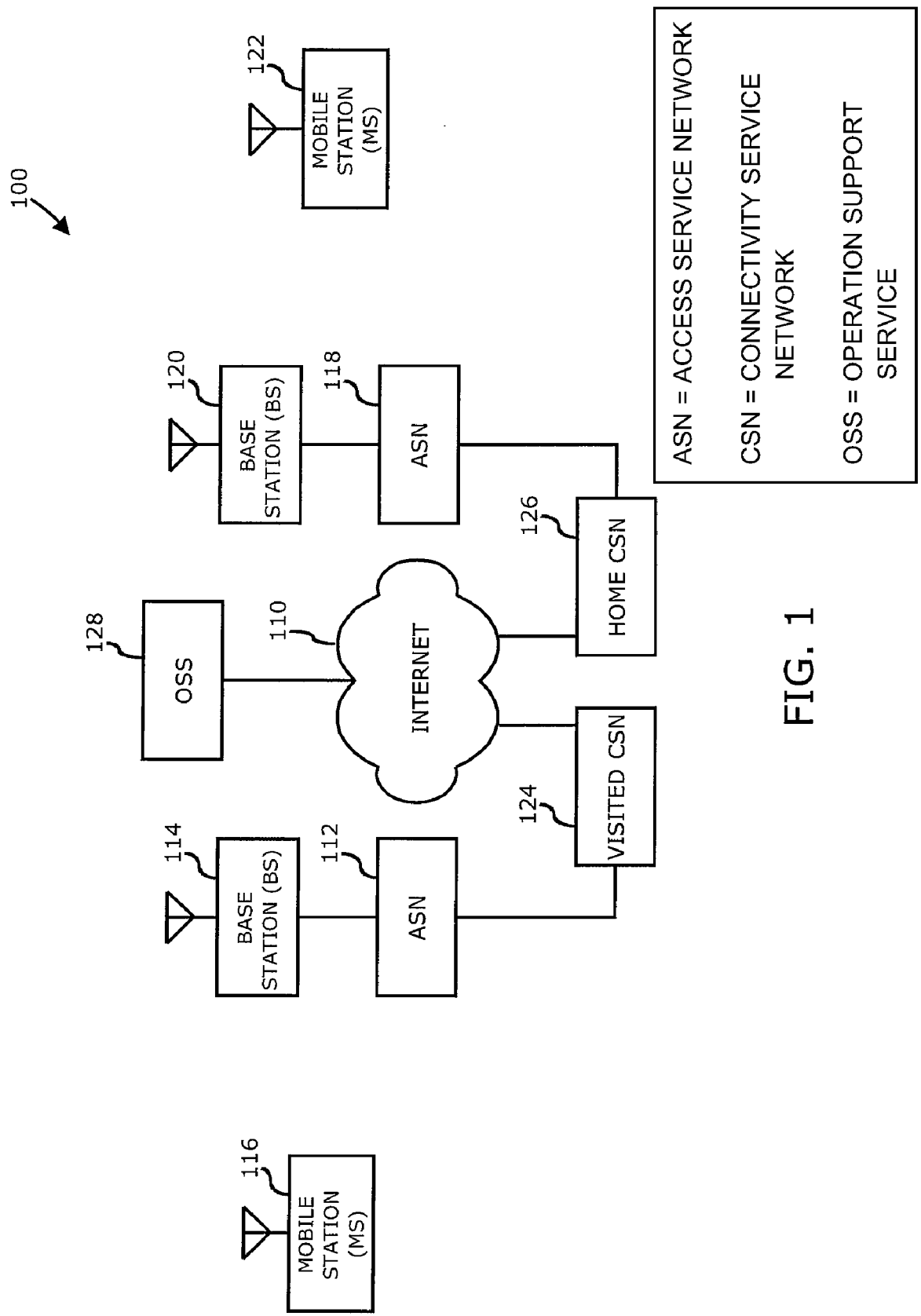
FIG. 1 is a block diagram of a wireless network in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a block diagram of a wireless network in accordance with one or more embodiments will be discussed. As shown in FIG. 1, network 100 may be an Internet Protocol (IP) type network comprising an Internet-type network 110, or the like, that is capable of supporting mobile wireless access and/or fixed wireless access to Internet 110. In one or more embodiments, network 100 may be in compliance with a Worldwide Interoperability for Microwave Access (WiMAX) standard or future generations of WiMAX, and in one particular embodiment may be in compliance with an Institute for Electrical and Electronics Engineers 802.16-2005 standard (IEEE 802.16-2005) or the like. In one or more alternative embodiments, network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, or other type of modulation scheme not limited to OFDM, and the scope of the claimed subject matter is not limited in these respects. As an example of mobile wireless access, access service network (ASN) 112 is capable of coupling with base station (BS) 114 to provide wireless communication between mobile station (MS) 116 and Internet 110. Mobile station 116 may comprise a mobile-type device or information handling system capable of wirelessly communicating via network 100, for example a notebook-type type computer, a cellular telephone, a personal digital assistant, or the like. ASN 112 may implement profiles that are capable of defining the mapping of network functions to one or more physical entities on network 100. Base station 114 may comprise radio equipment to provide radio-frequency (RF) communication with mobile station 116, and may comprise, for example, the physical layer (PHY) and media access control (MAC) layer equipment in compliance with an IEEE 802.16-2005 type standard. Base station 114 may further comprise an IP backplane to couple to Internet 110 via ASN 112, although the scope of the claimed subject matter is not limited in these respects.

Network 100 may further comprise a visited connectivity service network (CSN) 124 capable of providing one or more network functions including, but not limited to proxy- and/or relay-type functions, for example, authentication, authorization and accounting (AAA) functions, dynamic host configuration protocol (DHCP) functions, or domain name service controls or the like, domain gateways, such as public switched telephone network (PSTN) gateways or Voice-Over-Internet-Protocol (VOIP) gateways, and/or Internet Protocol (IP) type server functions, or the like. However, these are merely examples of the types of functions that are capable of being provided by visited CSN or home CSN 126, and the scope of the claimed subject matter is not limited in these respects. Visited CSN 124 may be referred to as a visited CSN in the case, for example, in which visited CSN 124 is not part of the regular service provider of mobile station 116, for example, in which mobile station 116 is roaming away from its home CSN, such as home CSN 126, or, for example, in which network 100 is part of the regular service provider of mobile station, but in which network 100 may be in another location or state that is not the main or home location of mobile station 116. In a fixed wireless arrangement, WiMAX mobile station 122 may be located in a home or business to provide home or business customer broadband access to Internet 110 via base station 120, ASN 118, and home CSN 126 in a manner similar to access by mobile station 116 via base station 114, ASN 112, and visited CSN 124, a difference being that mobile station 122 may be generally disposed in a stationary location, although it may be moved to different locations as needed, whereas mobile station 116 may be utilized at one or more locations if mobile station 116 is within range of base station 114 for example. In accordance with one or more embodiments, operation support system (OSS) 128 may be part of network 100 to provide management functions for network 100 and to provide interfaces between functional entities of network 100. Network 100 of FIG. 1 is merely one type of wireless network showing a certain number of the components of network 100; however, the scope of the claimed subject matter is not limited in these respects. In one or more embodiments, one or more of base station 114 or base station 120, or more base stations, may utilize a radio scheduler implementation as shown in and described with respect to FIG. 2 and FIG. 3, below.

Figure 2:
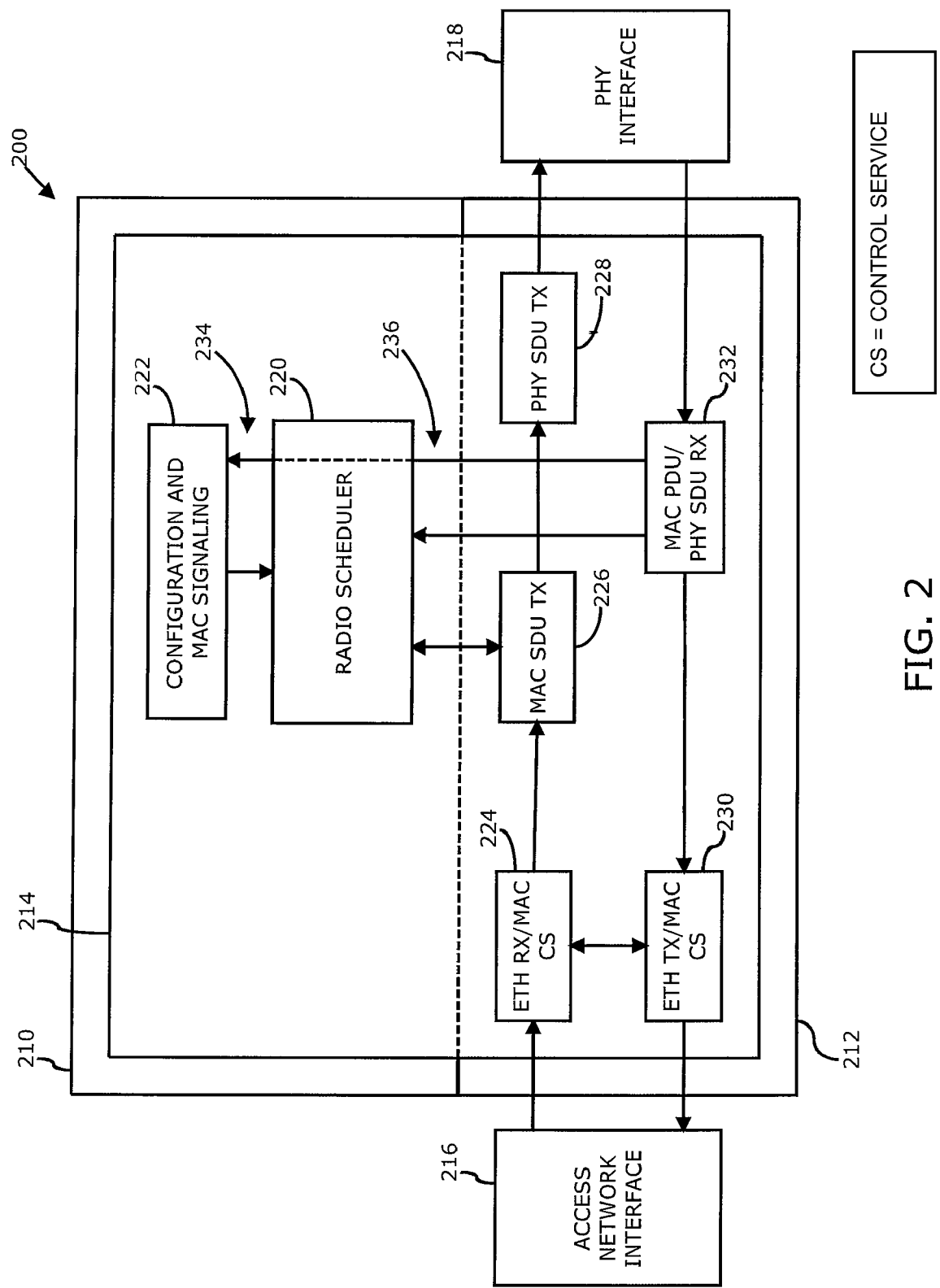
FIG. 2 is a block diagram of an interface between a radio scheduler and a data plane in accordance with one or more embodiments.

Referring now to FIG. 2, a block diagram of an interface between a radio scheduler and a data plane in accordance with one or more embodiments will be discussed. In or more embodiments, media access control (MAC) layer 200 may be implemented by a base station of a wireless network, for example by one or more of base station 114 or base station 120, or more base stations of network 100. MAC layer 200 may comprise control plane 210 and data plane 212, wherein one or more processors may implement the functions of control plane 210, and/or one or more processors may implement the functions of data plane 212 to implement a base station MAC application 214. In one or more particular embodiments, a multiprocessor system may be utilized to implement the functions of control plane 210 and/or data plane 212, and alternatively a multicore processor may be utilized to implement the functions of control plane 210 and/or data plane 212. For example, in a multiprocessor system, one processor may implement control plane 210 and another processor may implement data plane 212. In another example, in a multicore processor system, one core may implement control plane 210 and another core may implement data plane 212. In one or more embodiments, the architecture of MAC layer 200 shown in FIG. 1 may be implemented by Intel® Network Processors (IXP), for example Intel® IXP2350 Network Processors, generally referred to as network processors (IXP), and further may be applied to other hardware architectures in which mainstream functions of data plane 212 functions may be implemented on different a computing element or elements from the computing element that a decision-making element such as Radio Scheduler 220 is implemented. However, these are mere examples of how the functions of control plane 210 and data plane 212 may be processed by one or more processors and/or one or more cores, and the scope of the claimed subject matter is not limited in this respect.

In one or more embodiments, the processors that implement the functions of data plane 212 may be referred to as microengines in network processor (IXP) terminology.

Downlink (DL) packets are received from Access network interface 216 and classified by the Ethernet receive/media access control CS (Eth Rx/MAC CS) module or modules 224 and then stored in packet queues by media access control service data unit transmission (MAC SDU Tx) module or modules 230. The queue status is reported once per radio frame to Radio Scheduler 220. Uplink media access control protocol data units (MAC PDUs) are received by MAC PDU/PHY SDU Rx module or modules 232 from physical (PHY) interface 218 which may couple to one or more physical layer circuits. MAC PDU/PHY SDU Rx modules 232 collect uplink (UL) bandwidth requests and send the request as an aggregate request to Radio Scheduler 220 once per frame. MAC Management messages comprising MAC SDUs received on uplink management connections) are passed to the configuration and MAC signaling stack 222. Eth Tx/MAC CS module or modules 230 transfer remaining uplink MAC SDUs to upper layer transport protocol SDUs, for example Ethernet packets, and forward them via Access Network Interface 216. Radio Scheduler 220 running on a processor implementing control plane 210 performs scheduling decisions based at least in part on the information about queued downlink packets and received uplink bandwidth grant requests. Radio Scheduler 220 defines next radio frame contents by generating downlink (DL) and uplink (UL) maps; and also TX-vectors and RX-vectors for PHY interface 218, and a list of dequeue requests to the MAC SDU TX module 226. MAC SDU TX module 226, as directed by Radio Scheduler 220, dequeues the selected packets or their fragments and creates MAC PDUs. PHY SDU TX module 228 is responsible for transmission of such MAC PDUs via PHY Interface 218 towards the radio network circuits for transmission.

Configuration and MAC Signaling module 222 running on a control processor of control plane 210 is responsible for handling of the MAC management messages, allowing subscriber network entry, exit and reentry as well as for configuration of the whole device, including Radio Scheduler 220. Other modules of data plane 212 perform Automatic Repeat Request (ARQ) functionality and/or encryption/decryption, however the scope of the claimed subject matter is not limited in this respect.

In one or more embodiments, Radio Scheduler 220 communicates with the MAC software modules using specific interfaces. There are two main interfaces for Radio Scheduler 220. The first interface is control plane interface 234, which is the interface between Radio Scheduler 220 control plane 210 and which is accessible from Configuration and MAC Signaling module 222. Control plane interface 234 utilizes variable length Information Elements, or structures, which are enqueued onto communication queues accessed by Radio Scheduler 220 and upper MAC modules. Scheduler control requests are sent from Configuration and MAC Signaling module 220 to Radio Scheduler 220, and scheduler events are sent from Radio Scheduler 220 to Configuration and MAC Signaling module 222. The second interface is data plane interface 236 which results in variable-length multi-segment messages being passed via shared memory between one or more processors of data plane 212 and Radio Scheduler 220. Data plane interface 236 includes two groups, scheduler input comprising uplink requests and downlink enqueue reports, and scheduler output comprising downlink commands and data for the downlink pipeline of data plane 212.

For control plane interface 234, the Information Elements used for communication with Radio Scheduler 220 from the side of Configuration and MAC Signaling module 222 include scheduler control requests sent towards Radio Scheduler 220. Scheduler control request may include Radio Link Control support, Multiple zones support, Connection control support, Scanning support, Idle mode support, Sleep mode support, and/or MAC management messages support. Radio Link Control support comprises changes of the definition of the Burst Profile sets, changes of the Active Burst Profile ULIDL, changes of current SS TX Power, and/or changes of beam forming settings for a mobile station, Multiple zones support comprises add/delete zones, and/or changes to mobile station to zone assignment. Connection control support comprise adding different types of connections, like an unsolicited grant service (UGS) connection, real-time Packet Service (rt-PS) connection, non-real-time Packet Service (nrt-PS) connection, extended real-time Packet Service (ert-PS)-connection and best effort (BE) connection as well as changes of QoS parameters for those connections, and or to deleting connections. Scanning support comprises placing a mobile station into scanning mode, and/or canceling a mobile station scanning mode. Idle-mode support comprises forwarding paging related MAC messages. Sleep-mode support comprises placing one or more connections into sleep mode, and/or waking up one or more connections from sleep mode. MAC management messages support comprises transmitting periodic MAC messages, and/or forwarding singular MAC messages. The Information Elements used for communication with Radio Scheduler 220 and Configuration and MAC Signaling module 222 also include scheduler events sent from Radio Scheduler 220 to Configuration and MAC Signaling module 222, which may indicate if the Downlink MAC SDU queue has become empty, if the channel quality indicator (CQI) channel usage has expired, and of if a scanning process has been ended.

For data plane interface 236, communication between Radio Scheduler 220 and the modules of data plane 212 is performed using messages passed via a shared memory in one or more embodiments. The frequency of interactions may be kept relatively low and/or kept to absolute minimum, typically twice per frame, to achieve the desired efficiency. In one or more embodiments, the messages between Radio Scheduler 220 and data plane 212 may be aggregated. There are three types of Input messages which are capable of arriving at Radio Scheduler 220 from data plane 212. Such Input messages may include Uplink Scheduler Requests which contain various uplink related requests, Downlink Scheduler Requests which contain downlink enqueue reports, and/or a Reset request. An Uplink Scheduler Request is sent by MAC PDU/PHY SDU RX blocks 232, and contains a list of bandwidth requests received in the last radio frame. Each list element contains a triplet: <connection identifier, number of requested bytes, request type> in which request type is either aggregate or incremental request or CDMA bandwidth request code. A Downlink Scheduler Request is sent by MAC SDU TX module 226, and contains information about downlink packets received and enqueued by MAC SDU Tx module 226 since the last enqueue report in a form of a list. Each element of the list contains a pair: <connection identifier, number of enqueued bytes>. Additionally, Enqeue Report also contains a flag that triggers scheduling action for the next frame.

In one or more embodiments, there is one type of output message sent to data plane 212, which comprises downlink commands and data for the downlink pipeline for data plane 212. The downlink commands contain directions including dequeue requests for MAC SDU TX module 226. Downlink commands are sent by Radio Scheduler 220 to the MAC SDU TX module 226 running on data plane 212. Such messages contain a list of commands that are executed by the by MAC SDU TX module 226. As a result, MAC SDU TX module 226 is able to prepare MAC PDUs for the current downlink frame.

In one or more embodiments, data plane interface 236 handles the following uplink inputs. Directed Bandwidth Request type: aggregate, incremental, PM (poll me request), SI (slip indication); Anonymous Bandwidth Request type: code division multiple access (CDMA) bandwidth request; Frame Number Set Request type: FN set request; PHY Maintenance Zone Request type: space request; Synchronization type: UL Sync timestamp (from PHY SDU RX module 232); Hybrid ARQ acknowledge (HARQ ACK) Information: HarqAck. In one or more embodiments, data plane interface 236 handles the following downlink inputs. Status record type: regular packet, ARQ_retransmitted_data. In one or more embodiments, data plane interface 236 handles the following outputs (commands and/or data) thar are send to the downlink pipeline of data plane 212. End of Frame, MAC PDU Header, Rx/Tx Vector, PHY Tx End Of Flush, Data, ARQ feedback, Complete MAC PDU, Drop packet (due to timeout), ARQ Retransmitted Data, HARQ Retransmission trigger, MAC PDU Extended Header, Zone/Burst/sub-burst number, Drop complete SDU.

Figure 3:
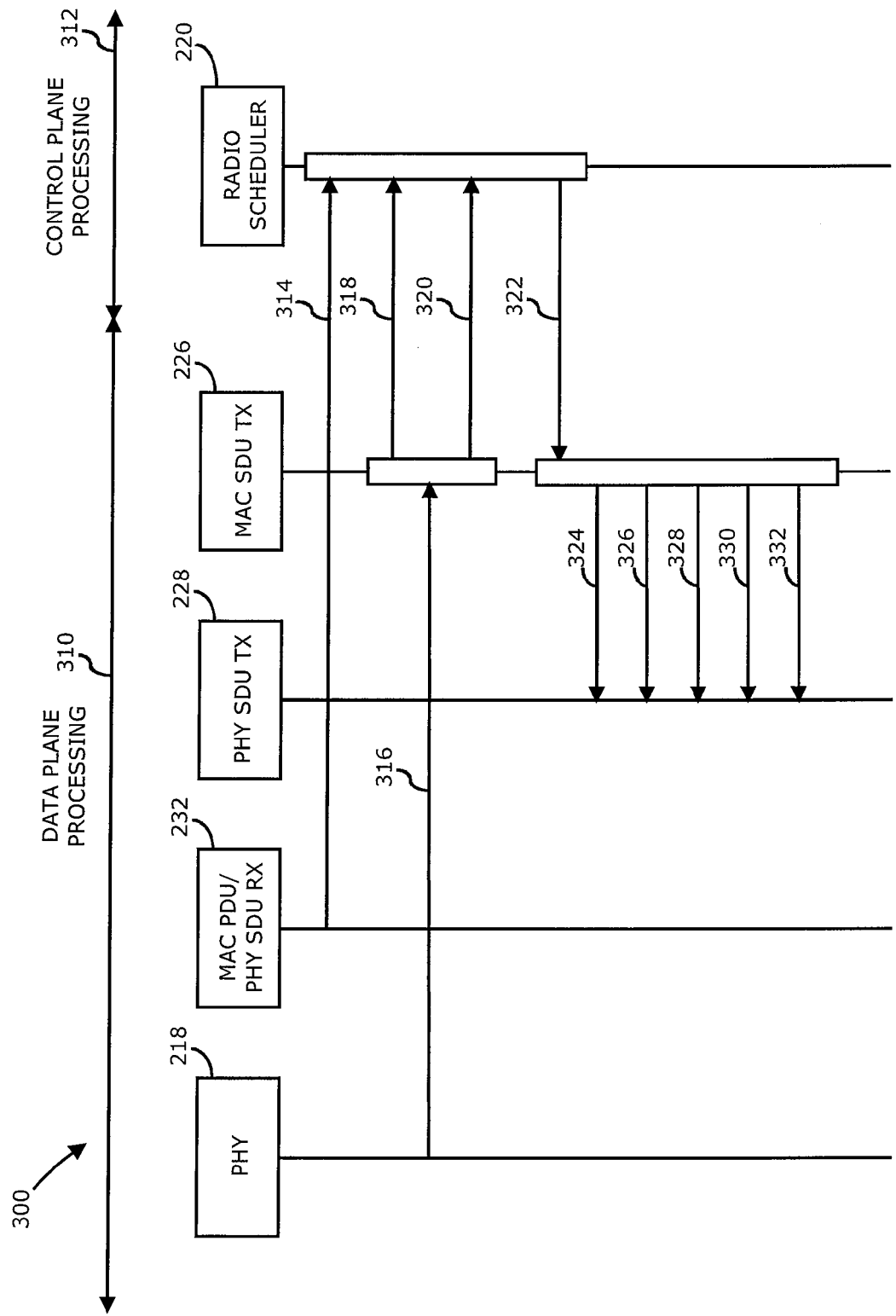
FIG. 3 is a communication timing diagram for an interface between a radio scheduler and a data plane in accordance with one or more embodiments.

Referring now to FIG. 3, a communication timing diagram for an interface between a radio scheduler and a data plane in accordance with one or more embodiments will be discussed. Diagram 300 of FIG. 3 shows the inter-module cooperation for one radio frame as an example. In diagram 300, radio scheduler 220 is disposed in control plane processing 312 for processing in control plane 210, and PHY interface 218, MAC PCU/PHY SDU RX module 232, PHY SDU TX module 228, and MAC SDU & TX module 226 are disposed in data plane processing 310 for processing in data plane 212. Radio Scheduler 220 receives a proper configuration, matching the current configuration and radio link conditions from Configuration and MAC Signaling 222 via control plane interface 234. Radio Scheduler 220 may also receive MAC Management messages prepared by Configuration and MAC Signaling 222 stack and planned for transmission in some specific frame. The provided configuration is used to perform scheduling actions for the current frame and remains constant for the life time of the present frame. Control plane interface 234 is also used to pass asynchronous events towards Configuration and MAC signaling module 222 if needed. Bandwidth requests received in the uplink frame are extracted and aggregated by the MAC PDU/PHY SDU Rx modules 232 and sent to Radio Scheduler 220 via Uplink Scheduler Request 314. MAC SDU Tx module 226 informs Radio Scheduler 220 about newly enqueued downlink packets, which is accomplished by sending a Downlink Enqueue Report 318 each time when a certain number of downlink packets was enqueued or a specified time elapsed. In the latter case, the Downlink Enqueue Report message contains Start Scheduling flag 316, which may be provided from MAC SDU TX module 226 to Radio Scheduler 220 at link 320. Upon receiving this notification, Radio Scheduler 220 starts its scheduling algorithm for the uplink and/or the downlink. New radio frame contents may be defined as a result thereof. Such a new radio frame definition (DL Map 326, UL Map 328, RX/TX vectors 324 for the local PHY interface 218 and dequeue/drop requests for MAC SDU TX module 226) is placed as an aggregate message into a Dequeue Command and sent to MAC SDU TX module 226. MAC SDU TC module 226 is responsible for sending DL Map, UL Map and TX/RX vectors towards the local PHY via PHY interface 218, and for preparing MAC PDUs 330, 332 from MAC SDUs selected for downlink transmission, and sending them to the PHY via PHY SDU Tx module 228 and PHY interface 218. In one or more embodiments, such a scenario may be repeated for every radio frame. In one or more embodiments, data packets transmitted between the radio network and the core network are not forwarded to Radio Scheduler 220. For its operation, Radio Scheduler 220 may receive just a minimum data set, containing necessary requests metadata. As a result, the interface between control plane 210 and data plane 212 does not require a higher capacity link to operate, although the scope of the claimed subject matter is not limited in this respect.

Figure 4:
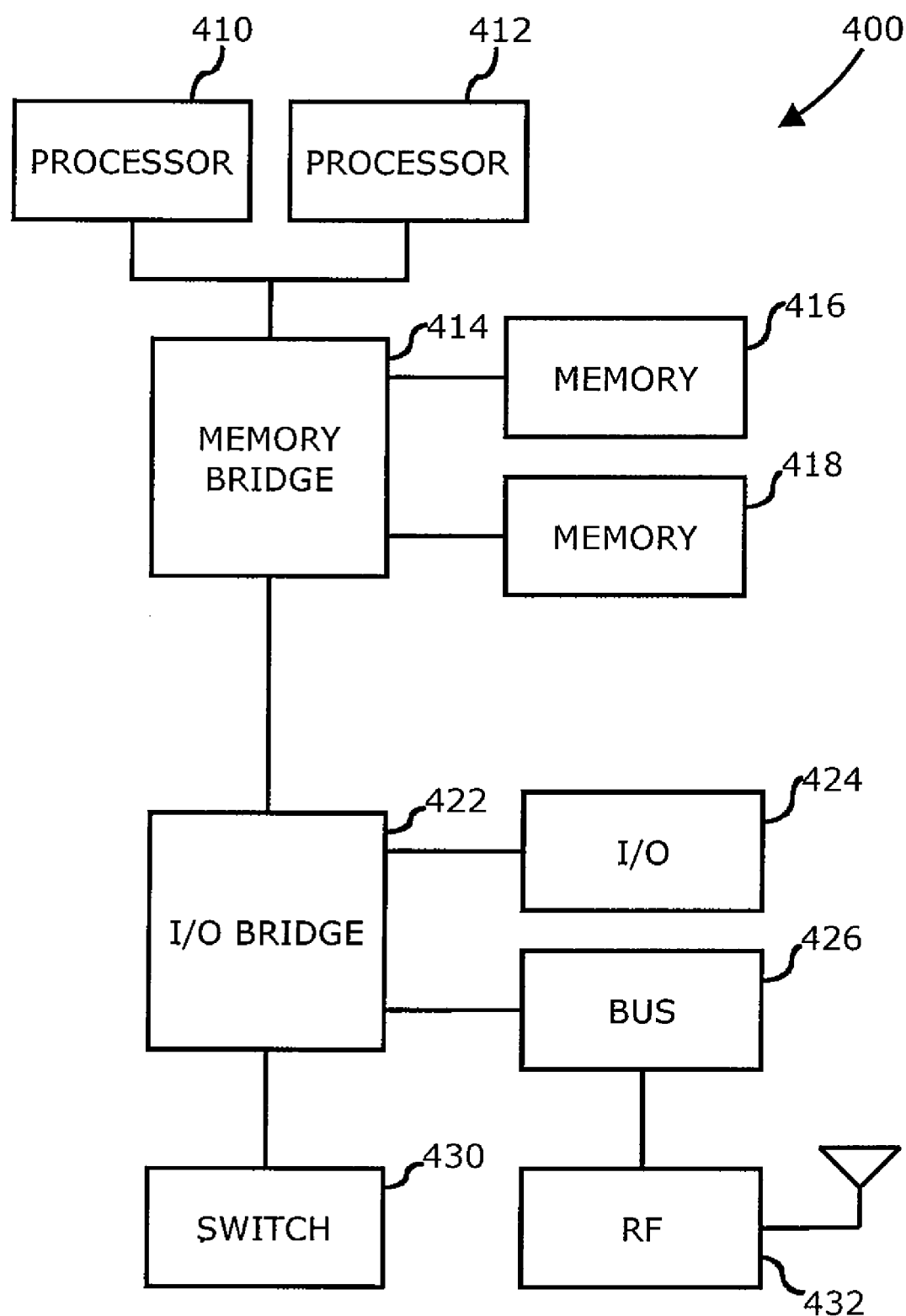
FIG. 4 is a block diagram of an information handling system capable of implementing a radio scheduler and data plane interface in accordance with one or more embodiments.

Referring now to FIG. 4, a block diagram of an information handling system capable of implementing a radio scheduler and data plane interface in accordance with one or more embodiments will be discussed. Information handling system 400 of FIG. 4 may tangibly embody one or more of any of the network elements of network 100 as shown in and described with respect to FIG. 1. For example, information handling system 400 may represent the hardware of base station 114 and/or mobile station 116, with greater or fewer components depending on the hardware specifications of the particular device or network element. Although information handling system 400 represents one example of several types of computing platforms, information handling system 400 may include more or fewer elements and/or different arrangements of elements than shown in FIG. 4, and the scope of the claimed subject matter is not limited in these respects.

Information handling system 400 may comprise one or more processors such as processor 410 and/or processor 412, which may comprise one or more processing cores. One or more of processor 410 and/or processor 412 may couple to one or more memories 416 and/or 418 via memory bridge 414, which may be disposed external to processors 410 and/or 412, or alternatively at least partially disposed within one or more of processors 410 and/or 412. Memory 416 and/or memory 418 may comprise various types of semiconductor based memory, for example volatile type memory and/or non-volatile type memory. In one or more embodiments, the architecture of MAC layer 200 of FIG. 2 may be implemented at least in part by processor 410, processor 412, memory 416, memory 418, and/or memory bridge 414, although the scope of the claimed subject matter is not limited in this respect.

Information handling system 400 may further comprise input/output (I/O) bridge 422 to couple to various types of I/O systems. I/O system 424 may comprise, for example, a universal serial bus (USB) type system, an IEEE 1394 type system, or the like, to couple one or more peripheral devices to information handling system 400. Bus system 426 may comprise one or more bus systems such as a peripheral component interconnect (PCI) express type bus or the like, to connect one or more peripheral devices to information handling system 400. Switch 430 may be utilized to couple one or more switched devices to I/O bridge 422, for example Gigabit Ethernet type devices or the like. Furthermore, as shown in FIG. 4, information handling system 400 may include a radio-frequency (RF) block 432 comprising RF circuits and devices for wireless communication with other wireless communication devices and/or via wireless networks such as network 100 of FIG. 1, for example where information handling system 400 embodies base station 114 and/or mobile station 116, although the scope of the claimed subject matter is not limited in this respect. In one or more embodiments, RF block 432 may include processing of the baseband signals, intermediate frequency (IF) signals, and/or radio-frequency (RF) signals, and may include the local PHY and PHY interface 218 as shown in FIG. 3, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a radio scheduler and data plane interface and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method, comprising:
    receiving two or more bandwidth requests in a first radio frame from one or more mobile stations for uplink transmissions from the one or more mobile stations;
    providing once per radio frame a first aggregated message from a data plane to a radio scheduler in a control plane, the first aggregated message comprising the two or more bandwidth requests for uplink transmissions received in the first radio frame from the one or more mobile stations;
    receiving two or more messages for downlink transmission of packets from a core network to be transmitted to the one or more of the mobile stations;
    providing once per radio frame a second aggregated message from the data plane to the radio scheduler in the control plane, the second aggregated message comprising the two or more messages received from the core network for downlink transmission; and
    scheduling at least one or more uplink transmissions or one or more downlink transmissions, or combinations thereof, by the radio scheduler.

2. A method as claimed in claim 1, wherein the two or more bandwidth requests are provided by a media access control protocol data unit (MAC PDU)/physical service data unit receive (PHY SDU Rx) module in the data plane to the radio scheduler in the control plane.

3. A method as claimed in claim 2, wherein a scheduling decision of the scheduling is provided by the radio scheduler in the control plane to a media access control service data unit transmission (MAC SDU TX) module in the data plane.

4. A method as claimed in claim 3, wherein the media access control service data unit transmission (MAC SDU Tx) module provides receive/transmit physical (Rx/Tx PHY) vectors, a downlink map, an uplink map, or one or more media access control protocol data units (MAC PDUs), to a physical service data unit transmission (PHY SDU Tx) module in response to the scheduling decision.

5. A method as claimed in claim 4, wherein a condition of a radio interface between a base-station and one or more mobile stations is fed back to the radio scheduler via an uplink scheduler request provided to the radio scheduler in the control plane from a media access control protocol data unit (MAC PDU)/physical service data unit receive (PHY SDU Rx) module in the data plane.

6. A method as claimed in claim 1, wherein a scheduling decision of said scheduling is provided by the radio scheduler in the control plane to a media access control service data unit transmission (MAC SDU TX) module in the data plane.

7. A method as claimed in claim 1, wherein the media access control service data unit transmission (MAC SDU Tx) module provides receive/transmit physical (Rx/Tx PHY) vectors, a downlink map, an uplink map, or one or more media access control protocol data units (MAC PDUs), to a physical service data unit transmission (PHY SDU Tx) module in response to the scheduling decision.

8. A method as claimed in claim 1, wherein a condition of a radio interface between a base-station and one or more mobile stations is fed back to the radio scheduler via an uplink scheduler request provided to the radio scheduler in the control plane from a media access control protocol data unit (MAC PDU)/physical service data unit receive (PHY SDU Rx) module in the data plane.

* * * * *